(12) United States Patent
Fredrick

(10) Patent No.: US 10,415,694 B1
(45) Date of Patent: *Sep. 17, 2019

(54) SPEED SHIFTING CONVERSION FOR MANUAL TRANSMISSIONS

(71) Applicant: Gray G. Fredrick, Cookeville, TN (US)

(72) Inventor: Gray G. Fredrick, Cookeville, TN (US)

(*) Notice: Subject to any disclaimer, the term of this patent is extended or adjusted under 35 U.S.C. 154(b) by 408 days.

This patent is subject to a terminal disclaimer.

(21) Appl. No.: 15/334,426

(22) Filed: Oct. 26, 2016

Related U.S. Application Data

(63) Continuation of application No. 14/544,758, filed on Feb. 12, 2015, now Pat. No. 9,506,556.

(51) Int. Cl.
*F16H 59/04* (2006.01)
*F16H 61/24* (2006.01)
*F16H 59/02* (2006.01)

(52) U.S. Cl.
CPC .............. *F16H 59/04* (2013.01); *F16H 61/24* (2013.01); *F16H 2059/0269* (2013.01); *F16H 2059/0295* (2013.01); *F16H 2061/242* (2013.01)

(58) Field of Classification Search
CPC .. F16H 59/04; F16H 61/24; F16H 2059/0269; F16H 2059/0295
See application file for complete search history.

(56) References Cited

U.S. PATENT DOCUMENTS

| | | | | |
|---|---|---|---|---|
| 3,053,102 | A | * | 9/1962 | Alfieri ................. F16H 61/30 74/335 |
| 4,287,784 | A | * | 9/1981 | Cedendahl ............ F16H 59/042 74/388 R |
| 4,338,828 | A | | 7/1982 | Ruhlman |
| 4,912,997 | A | | 4/1990 | Malcolm et al. |
| 4,936,156 | A | * | 6/1990 | Peterson .............. F16H 61/30 74/335 |
| 5,505,103 | A | | 4/1996 | Nordstrom et al. |
| 5,592,856 | A | | 1/1997 | Parsons |
| 5,878,622 | A | | 3/1999 | Tischer |
| 9,506,556 | B1 | * | 11/2016 | Fredrick ............. F16H 59/0278 |

* cited by examiner

*Primary Examiner* — David M Fenstermacher
(74) *Attorney, Agent, or Firm* — Luedeka Neely Group, PC

(57) ABSTRACT

The present invention provides separately adjustable right and left spring centering forces for the gearshift lever of manual automobile transmissions by locating individual coil springs to bear on separate spring biasing members extending from the shift lever ball with a separate spring force adjusting screw for each spring and further provides for relocating the gearshift lever of a non-original transmission with a horizontally keyed offset arm connecting the transmission gearshift stub shaft to the gearshift lever with vertical screw connections loaded in tension rather than bending or shear.

6 Claims, 1 Drawing Sheet

SPEED SHIFTING CONVERSION FOR MANUAL TRANSMISSIONS

This application is a continuation of co-pending (allowed) U.S. application Ser. No. 14/544,758 filed Feb. 12, 2015, and entitled Speed Shifting Conversion for Manual Transmissions, incorporated by reference herein in its entirety.

TECHNICAL FIELD

The present invention relates to the field of multiple speed ratio transmissions and most particularly, to manually shifted automobile transmissions.

BACKGROUND

Automobiles can mean various things to their owners. To many, an automobile is nothing more than transportation but, things such as inferred status, appearance, economy, comfort and ergonomics may be all important. To some, anything automotive may be a passion, and these people are classified as collectors, customizers, maybe drivers or perhaps, just "car crazy". Many true enthusiasts prefer a manual transmission above an automatic for reasons of performance and/or precise control.

Gear ratio selection in manual transmissions is aided by a gate mechanism for guiding the shift lever movements to select a particular gear ratio. In earlier times, when engines ran at lower speeds and had relatively flat torque curves, shifting gears was not a skill issue. Engine design has since become more sophisticated, with more power at higher rpm and diminishing torque at the top end. This requires a graduated selection of gear ratios to access the performance potential. Where three-speed transmissions were once the norm, we now commonly see five and six speeds.

Having more speed ratio options does require more of the driver in skill and discernment, so assistance for speed selection in five and six speed transmissions is typically provided by "spring centering". The industry-wide standard solution is a Belleville spring washer around the shift lever. This conically shaped spring washer is compressed as the shift lever is moved to either side of center, and the spring force urges the lever back toward center, where it aligns with the gated third and fourth speed slots.

In the standardized arrangement, centering force is equal and fixed, whether shifting from second speed to third, or from fifth speed to fourth. This is acceptable to most people, but many drivers are troubled by limitations inherent to this centering arrangement. On acceleration, heavy bias toward center is helpful for quickly shifting from second to third, but will also resist the up-shift from fourth-to-fifth. Too little bias will not give the positive centering needed for a quick shift from second to third, possibly causing a missed shift. When decelerating, down-shifts are generally made while braking and are not so time critical. Therefore, a much lighter bias toward center from fifth/sixth should be preferred, but what feels right to one driver may not be agreeable to the next. The commercially acceptable Belleville spring centering solution of the prior art addresses the gate sensing needs of every day drivers.

Competitive drivers, looking for track or drag strip performance, where every fraction of a second counts, want each shift to be quick and certain, with never a miss. Particularly in "drag" racing, the driver will minimize time lost during a shift by simply "fanning" the clutch pedal as the shift lever is slammed from second to third or fourth to fifth. Such shifting requires the driver to have perfect timing and confidence that he will hit the gate opening. The shift from second to third is particularly critical, so a heavy spring centering force is desirable here; heavy enough to push the shifter across to the third speed gate slot as it passes through neutral. Because the industry standard arrangement dictates equal force on the opposite gate that same heavy force will prevent an accurate and timely up shift to fifth.

Modified engines in competition are significantly more powerful than stock, even exceeding stock transmission capacity. Thus, serious competitors frequently replace their stock transmission with a more suitable unit for performance and/or reliability. Installing a non-stock transmission usually creates a host of problems, such as frame or sheet metal interferences, mounting adaptation, driveshaft changes and shift lever location. For the most part, these problems yield to skilled mechanics using available parts. Gearshift lever relocation is generally resolved by bolting a forged or welded offset lever to the transmission stub shaft. The stub shaft bolts are close together, so that the severe, reversing shear loads make loosening just a matter of time. The aforesaid spring-centering issue is shrugged off for lack of a solution.

Objects of the present invention are, first, to provide speed selection apparatus, which facilitates ergonomic adaption of a non-stock transmission into an automobile. A second object is to provide an adjustable spring centering bias, according to an individual driver's desire. A third object is that this spring centering bias be separately adjustable from left to center and from right to center. A fourth object is to provide apparatus, which permits adjustment of the gearshift lever location according to the individual driver's preference. Yet other objects are that the apparatus of the present invention be inexpensive, rugged and capable of being quickly and easily adjusted, according to the driver's preference.

SUMMARY OF THE INVENTION

A preferred embodiment of the present invention addresses the specialized ergonomic needs of a competitive driver by providing apparatus for positioning the gearshift lever so that it comes to hand naturally, individual driver measurements, transmission "swaps", or modifications notwithstanding. Here, positional adjustability is provided by a cantilevered offset arm extending from the gearshift stub shaft to the gearshift lever at a selected angle. Internal threads in the stub shaft and shift lever receive clamping screws that hold the sub-assembly together in spite of repeated loading in every direction. Where other efforts have made shift lever connections using screw members loading in shear and bending, connections of the present invention are more reliably secured with screw members in pure tension.

The offset arm has indexed connections at each end, firstly, to engage the gearshift stub shaft at an outwardly extending angle and secondly, to engage the gearshift lever itself at a compensating angle, so as to maintain it's front to rear orientation. Moreover, by using a cantilevered offset of selected length at a selected angle, the gearshift lever may be repositioned according to the personal need of any individual.

The preferred embodiment of the present inventions also addresses the short-comings of commercially available "spring Centering" noted by competitive drivers. The use of Belleville spring washers for spring centering has been the universal, industry-wide practice. The spring washer, placed over the gearshift stub shaft, is compressed whenever the shaft is displaced from center, either to the right or left. Thus, right and left centering forces are always equal and can be changed only by using a different spring washer. The present invention replaces the industry standard. Thus, right and left centering forces are always equal can be changed only by using a different spring washer. The present invention replaces the industry standard Belleville spring with separate coil springs at either side of the gearshift lever.

In a preferred embodiment of the present invention, vertically acting springs, located below the gearshift lever pivotal center, to avoid overhead interference in the transmission installation, but other arrangements are possible within the scope of the invention. The coil springs, are held in a sliding carrier and bear upwardly against a shifter ball cross pin member. A screw raises or lowers the carrier to adjust the separate spring centering forces as desired.

DESCRIPTION OF THE DRAWINGS

The present invention is described with reference to drawings of a preferred example of how the invention can be made and used. In these drawings, reference characters are used throughout the views to indicate same or corresponding parts. The embodiment described herein is exemplary. Many details are well known in the arts, and as such may be neither shown nor described.

DETAILED DESCRIPTION OF THE DISCLOSURE

Figure 1:
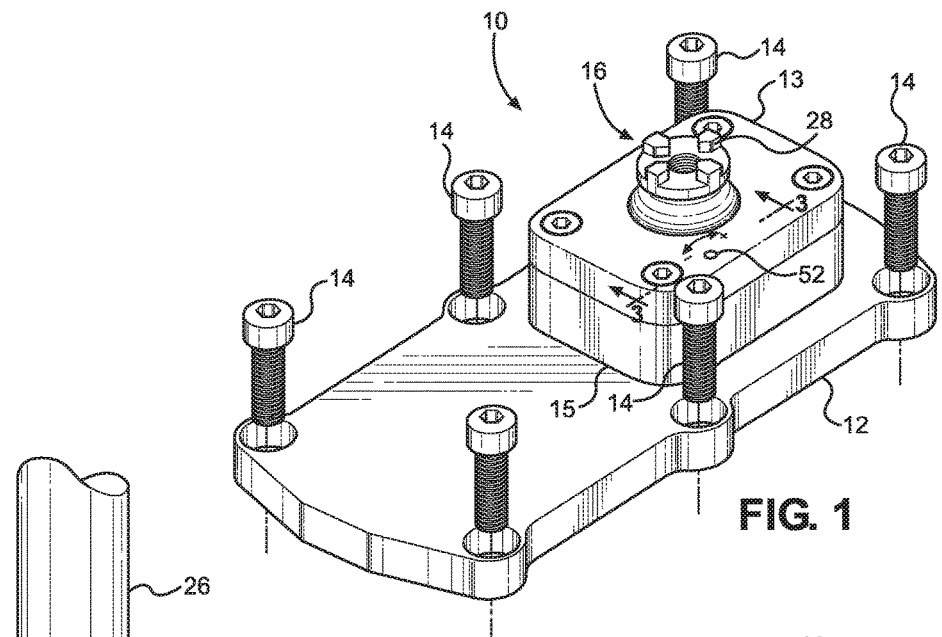
FIG. 1 is a perspective view of a preferred embodiment of a gearshift apparatus of the present inventions.
Figure 2:
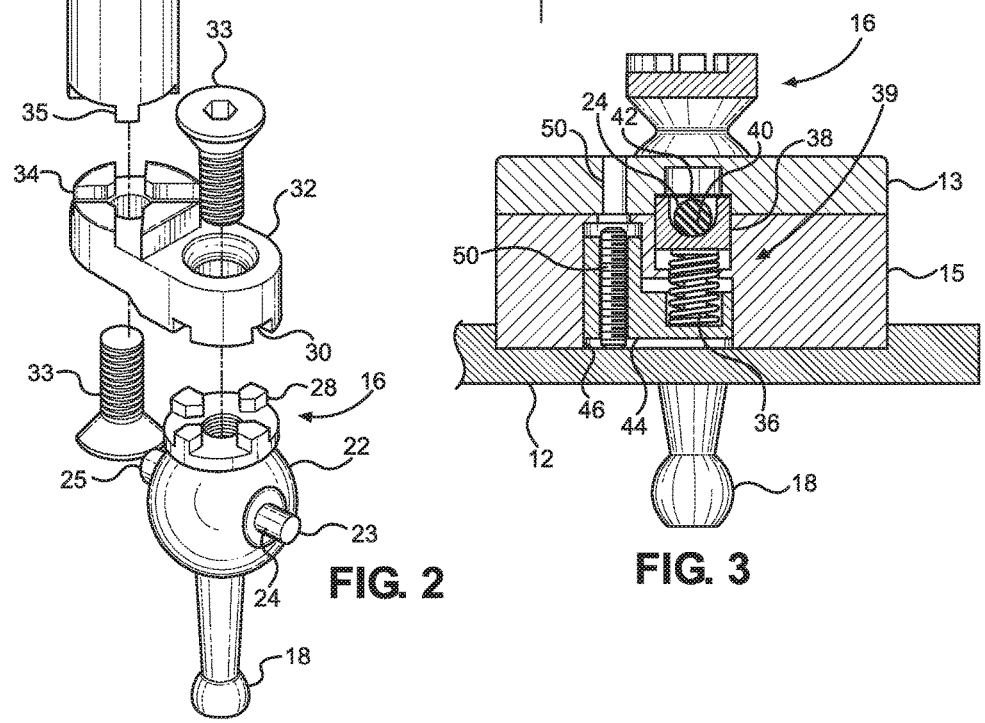
FIG. 2 is an exploded perspective view of the gearshift lever subassembly for connection to the preferred embodiment of FIG. 1.
Figure 3:
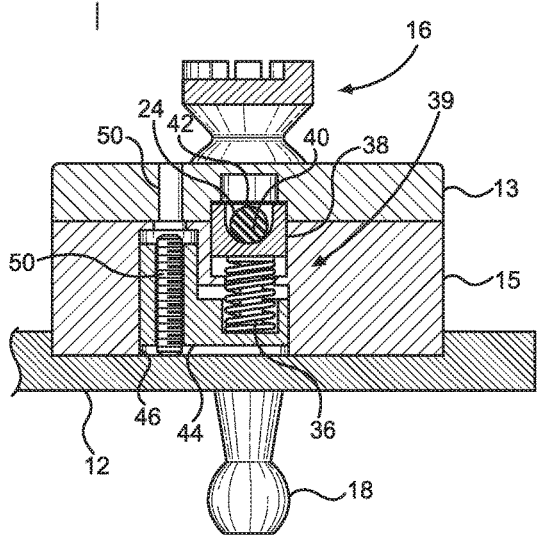
FIG. 3 is a cross-section view of the spring centering components of the preferred embodiment of FIG. 1 taken along section plane 3-3.

FIGS. 1-3 show a preferred embodiment 10 of the present inventions. Assembly plate 12 is configured to interchange with the original equipment (OE) plate, with bolts 14 mounting it securely. In this manner, selector ball 18, at the lower end of gearshift stub shaft 16, engages un-shown OE gate 20, to be guided for speed selection. Gearshift stub shaft 16 further comprises spherical bearing portion 22, with cross pin member 24, mounted between upper and lower plate members 13 and 15, to allow free movement of selector ball 18 within the limits of un-shown gate 20.

A driver will adjust the seat to best position his feet for use of the clutch pedal and then, the location of shift lever 26 may be uncomfortable, making it awkward to shift gears quickly. The upper end of gearshift stub shaft 16 terminates in orthogonally oriented keys 28, which permits angularly indexed assembly with orthogonal keyways 30 of cantilevered offset arm 32, so that offset arm 32 extends outwardly at 90°, 180°, 270° or 360°. In a similar manner, shift lever 26 is connected to the opposite end of offset arm 32, but in this case, keyway pattern 34 and keys 35 are rotated 45°. Thus, offset arm 32, with orthogonal keyways 30 at one end and similar keyways 34 rotated 45° at the other, provides indexed connections at each end, firstly, to engage the gear shift stub shaft 16 at eight possible outwardly extending angles, and secondly, to engage shift lever 26 at a compensating angle, so as to maintain its longitudinal orientation. Internal threads in stub shaft 16 and shift lever 26 receive clamping screws 33 in tension, not subject to side or shear loading, to make secure connections. Moreover, an offset arm 32 of appropriate length, set at a selected angle, will locate shift lever 26 according to the personal need of any individual.

FIG. 3 is a section view of a preferred embodiment of the present inventions. Here is shown how the industry-wide standard Belleville centering spring is replaced by a separately adjustable centering spring assembly 39 at each side of gearshift stub shaft 16. Vertically acting coil spring 36, below stub shaft pivotal center 40 acts against cradle member 38, urging it against position stopping shoulder 42 at the "centered" upper limit of its travel. Cradle member 38 bears against extended end 23 of cross pin biasing member 24, urging gearshift stub shaft 16 and shift lever 26 toward its center position. Spring 36 is seated on sliding spring carrier 44, which is guided for movement in closely fitting bore 46.

Adjusting screw 50, accessed through hole 52, bears against assembly plate 12 to raise or lower sliding spring carrier 44, and thereby adjust the centering force of coil spring 36 against extended end 23 of cross-pin member 24. An identical opposing and separately adjustable centering spring assembly 39 works against extended end 25 of cross pin biasing member 24 on the opposite side of gearshift stub shaft 16. Placement of centering spring assemblies 39 below gearshift lever pivotal center 40, avoids overhead interference in the transmission installation.

The restrictive description and drawings of the specific examples above do not point out what an infringement of this patent would be, but are to provide at least one explanation of how to use and make the invention. Parts may be substituted for those described or may be added or altered but not withstanding, the limits of the invention and the bounds of the patent protection are measured by and defined in the following claims.

I claim:

1. Apparatus for adapting a manually shifted automobile transmission according to an individual driver's preferences, comprising:
    a speed selection shaft including a spherical bearing portion mounted for multidirectional pivotal movement and having a pair of oppositely extending biasing members extending from opposite sides of the spherical bearing portion;
    position stops to define a centered speed selection shaft movement position;
    a pair of vertically acting biasing springs each adapted to exert a force on one of the biasing members toward the position stops, so as to always urge the speed selection shaft toward its centered position; and
    biasing spring adjustment members for separately setting the forces exerted by the biasing springs on the biasing members.

2. Apparatus for adapting a manually shifted automobile transmission according to an individual driver's preferences, comprising:
    upper and lower horizontal plate members;
    a speed selection shaft mounted between the upper and lower plate members for multidirectional pivotal movement and including a spherical bearing portion having a pair of pin members extending laterally from opposite sides of the spherical bearing portion; and
    a pair of separately adjustable spring assemblies located between the upper and lower plate members, each spring assembly comprising a spring seated in a spring carrier located in a bore of the lower plate, the spring being vertically oriented below one of the pin members of the spherical bearing portion and located to apply spring pressure to the pin member; the position of the spring carrier being adjustable, wherein adjustment of the position of the spring carrier adjusts the spring pressure applied to the pin member by the spring.

3. The apparatus of claim 2, wherein the spring carrier is slidingly mounted in the bore.

4. The apparatus of claim 2, wherein each spring assembly further comprises an adjustment screw bearing against the lower plate and adjustment of the adjustment screw adjusts the position of the spring carrier.

5. The apparatus of claim 4, wherein access for adjustment of the adjustment screw is provided by an aperture extending through the upper plate.

6. The apparatus of claim 2, further comprising a cradle member located between the spring and the pin member.

* * * * *